Patented Feb. 23, 1943

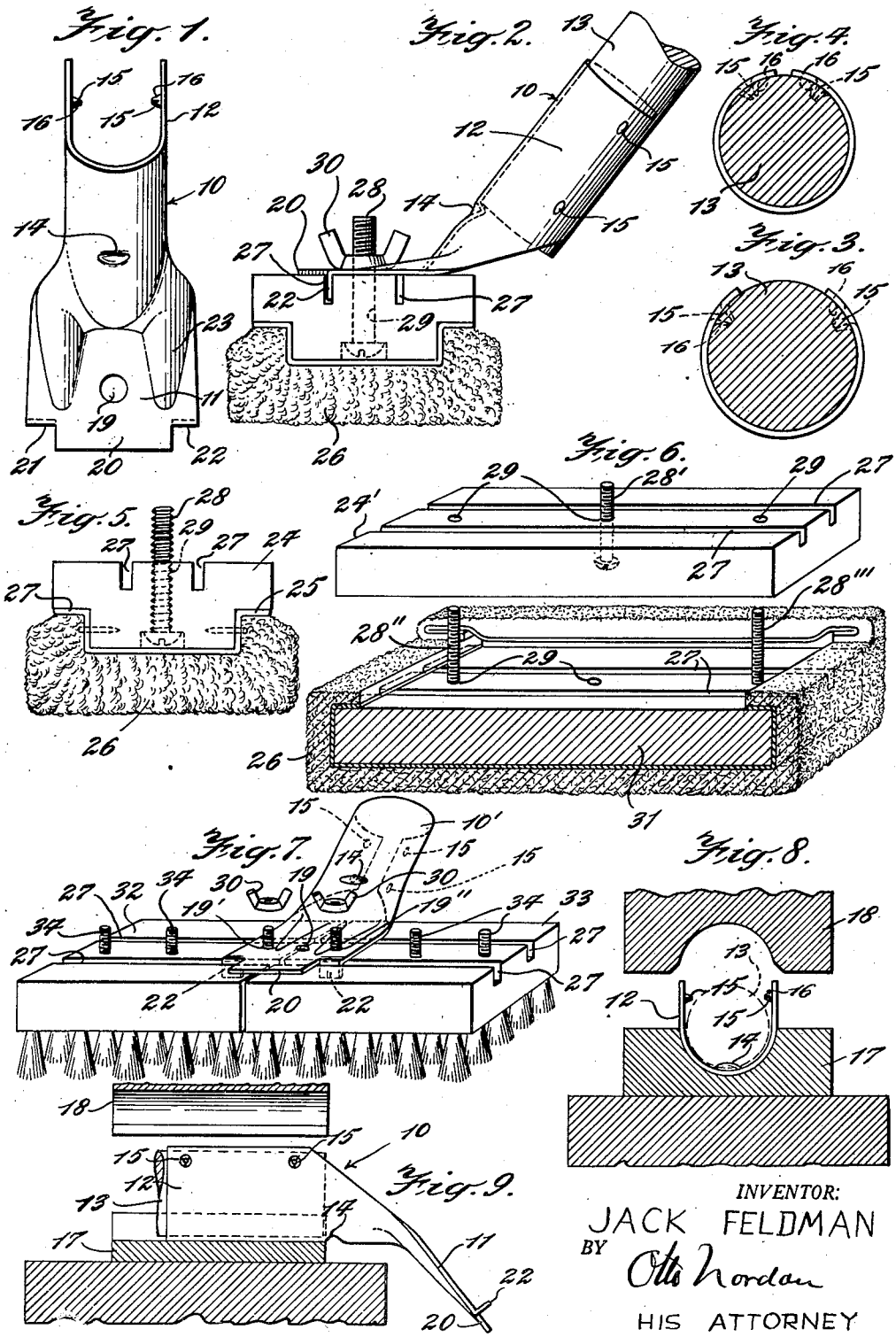

2,312,086

UNITED STATES PATENT OFFICE 2,312,086

MOP CONSTRUCTION AND THE LIKE

Jack Feldman, New York, N. Y.

Application March 12, 1942, Serial No. 434,413

3 Claims. (Cl. 15—146)

This invention relates to a new and improved union for mops, brushes and the like and has reference as well to an improved mop or brush back for use with the new union.

Floor mops, brushes and similar utensils are usually provided with a long stick or handle, one end of which is connected to the utensil while the other end is grasped by the operator. Thus, the housewife desiring to brush or wax the floor need not kneel down but can work the floor in upright position. A union or connector is used to attach the utensil to the handle.

A disadvantage of such connectors, on the one hand, is that the brush or the like is permanently attached to the handle or, if the utensil is detachable, the connector is complicated, cumbersome, and may be secured to the utensil at but one point. On the other hand, such connectors require an exactly fitting handle which has to be tapered in order to fit into a rigid conical sleeve of the connector.

These and other disadvantages are overcome by the present invention as more fully described hereafter.

An object of the present invention is to provide a union for floor brushes or a similar utensil which may be permanently connected to a handle and detachably secured to the utensil.

Another object of the invention is to provide a union suitable for attachment to handles of varying thicknesses.

A further object of the invention is to provide a union of preliminary shape which may be given final shape while being permanently secured to the handle.

A further object is to provide a back or support for a brush, mop or similar utensil adapted to be engaged by the union in different positions: centrally, laterally off-set or reversed.

A still further object of the invention is to provide a union adapted to connect a handle to two brushes, for instance, so as to form a unitary brush of double size.

With these and other objects in view as will become apparent hereafter, my invention is fully described in the following specification and illustrated, by way of example, in the accompanying drawing, in which—

Fig. 1 is a plan view of the pre-formed unattached union according to the invention;

Fig. 2 is a side view of the union attached to a handle and mop;

Fig. 3 is a transverse sectional view of the attached union shown in Fig. 2;

Fig. 4 is a transverse sectional view of the same union as illustrated in Fig. 3, except that in Fig. 4 the union is attached to a handle of less diameter than that of Fig. 3;

Fig. 5 is an end view of one embodiment of a mop showing the improved back construction according to the invention;

Fig. 6 illustrates another embodiment of the improved mop back construction.

Fig. 7 shows the new union, according to the invention, interconnecting a pair of brushes.

Fig. 8 is an end view showing a handle as inserted in the new union just prior to its attachment by means of pressing dies;

Fig. 9 is a side view of the elements shown in Fig. 8.

In the drawing, reference numeral 10 designates the union according to the invention. Union 10 is made of a rigid, single thickness of metal or other suitable material. Lower part 11 is adapted for connection to a mop, brush or other implement. Upper part 12, which is of U-shaped transverse section, is adapted to receive handle 13. Union 10 thus serves to unite a handle with a brush or the like. Handle 13, when inserted in U-shaped element 12, abuts against stop 14 which limits its downward movement. Stop 14 is preferably made by pressing the metal inwardly to form a projection. If desired, stop 14 may of course be made of a separate piece or in any other suitable manner. U-shaped portion 12 is provided with four inwardly punched points 15. Preferably, points 15 are punched in such manner that the metal forming the points is cut to produce sharp, triangular tongues 16. One end of handle 13 is secured to union 10 as shown in Figs. 8 and 9. When pressing dies 17, 18 are forced together, the U-shaped transverse section of portion 12 is transformed into a substantially circular cross-section and the sharp tongues 16 of points 15 are forced into handle 13 for permanent connection thereto. Due to the U-shaped contour of element 12, handles of varying thicknesses (diameters) may be inserted between the open shanks of the U. Subsequently, dies 17, 18 compress U-shaped element 12 so as to make its contour conform to the shape of handle 13, irrespective of the diameter thereof (within certain limits). According to the invention, it is not intended that the edges of U-shaped part 12 meet to form a closed tube. Actual tests have shown that a very strong connection is formed when union 10 embraces just more than half the circumference of handle 13. I prefer to use four points 15 to interconnect union 10 and handle 13. Nevertheless, a larger or smaller number of points 15 may be used. I have found two points 15 for example to be perfectly safe.

The U-shape of element 12 affords a considerable advantage in that the end of handle 13 may simply be slid in between the shanks of the U, or forced in under slight pressure.

The connectors sold heretofore by the metal manufacturers were provided with a rigid tubular sleeve into which the end of the handle had to be forced. If the handles were just a fraction thicker, they could not be used at all and if thinner, the connection proved too loose. As a result, many manufacturers resorted to the use of a costlier handle with a tapering end. Moreover, in the case of completely preformed tubular connectors, separate fastening means such as nails had to be used to attach the connector to the handle. No such separate fastening means are needed in the present construction. Nor is handle 13 of the present construction tapered at the connecting end; on the contrary, it is of uniform thickness as delivered from the saw mill. According to the invention, union 10 is delivered to the brushmaker with a U-shaped portion 12. The brush-maker secures the handle 13 to union 12 as above described. Thus, one type of union 10 can be fitted to handles of varying diameters and a permanent connection is established by means of points 15, without the use of nails or the like. Handle 13 has been described as having circular cross-section because this has been found to be the most practical shape. However, it will be obvious that any other cross-section may be used and the shape of union 10 modified accordingly.

Lower part 11 of union 10 is provided with an aperture 19, a flat central lip 20, and two downwardly projecting square or rectangular prongs 21, 22. Inasmuch as a single thickness of metal is used, part 11 is preferably provided with reinforcing ribs 23. Ribs 23 may be formed by stamping for instance, and in one operation with the remaining parts of union 10.

The preferred mop back, brush back or support for a similar utensil is illustrated in Figs. 2, 5, 6 and 7. The wax applicator shown in Figs. 2 and 5 consists of a back or support 24 of rectangular shape. Two parallel longitudinal shoulders 25 are provided on the underside of back 24. Lamb skin 26 covers the underside of back 24 and is fastened to the same along shoulders 25 by means of nails, staples, or the like. On the top of back 24, two parallel grooves 27 are provided. Bolt 28 may be inserted in aperture 29 located in the center of back 24 or any other desired place between grooves 27. Mop back 24 is secured to union 10 by inserting bolt 28 of back 24 in aperture 19 of union 10 and by placing prongs 21, 22 in one of grooves 27, as illustrated for inst. in Fig. 2. Union 10 is held in place by means of a nut 30 fastened to bolt 28. The latter holds lip 20 and prongs 21, 22 of union 10 in secure engagement with back 24. Prongs 21, 22 are flat pieces preferably of square contour, although they may be given any other suitable form desired. The purpose of prongs 21, 22 is to prevent union 10 and attached handle 13 from turning with respect to back 24. If a number of holes 29 are provided in back 24 (see for instance Fig. 6), union 10 may be affixed to back 24 in different positions, if desired, but a single groove 27 may be provided, although it is advantageous to provide two grooves 27 in order that the mop or brush may be reversed. Thus, even wear of the cleaning surface, bristles, etc., is assured.

The wax applier shown in Fig. 6 comprises a back 24' provided with two grooves 27 and three holes 29. In this device, the lambskin 26 is clamped to back 24' by means of block 31. The latter carries two bolts 28'', 28''' and may be provided with two grooves 27, but the same are not absolutely necessary. The advantage in providing block 31 with grooves 27 resides in that block 31 may in that case be interchanged with back 24'. The latter carries a central bolt 28' although bolt 28' may equally well be carried by block 31. Lambskin 26 is folded over the top edges of block 31, as shown, and thereupon the two bolts 28'', 28''' are inserted in holes 29 of back 24' and the latter is tightened against block 31 by means of nuts 30 (see Figs. 2 and 7). When it is desired to clean or exchange lambskin 26, back 24' is simply loosened from block 31 and lambskin 26 (or other cleaning rag or the like) is removed. The wax applier is attached to union 10 in the same manner as in Figs. 2 and 5. Any one of the bolts 28', 28'', 28''' may be inserted in aperture 19 of union 10. Thus union 10 and handle 13 may be centrally secured to the mop 24' (by means of bolt 28') or laterally off-set, somewhat like a golf club (by means of bolts 28'' and 28'''). By off-setting the mop (brush or the like) with respect to the handle, cleaning of ordinarily inaccessible places will be facilitated.

According to the present invention, two brushes 32, 33 may be combined to form a larger unit. The back of each brush 32, 33 is provided with two grooves 27. A plurality of bolts 34 projects from each brush back. Each brush 32, 33 may be used separately in conjunction with union 10 in the same manner as the devices shown in Figs. 2, 5 and 6. On the other hand, two brushes 32, 33 may be combined to form a unit by means of union 10'. The latter differs from union 10 (Fig. 1) only in the use of two additional apertures 19' and 19''. One bolt 34 of each brush 32, 33, is inserted in one aperture 19', 19'' as shown in Fig. 7. A rigid double brush unit is obtained when nuts 30 are tightened on bolts 34. Union 10' may of course also be used separately with either brush 32, 33. It will be clear that instead of using a pair of brushes 32, 33, two mops, wax appliers or other utensils may be combined, or, for some operations, even one brush and one applier may be joined together as a unit.

I am aware of the fact that the number of bolts and their positions may be changed and many other details of construction altered without departing from the spirit and scope of the present invention. I therefore do not wish to be understood as limiting myself to the exact structural details shown and described herein.

I claim:

1. A convertible mop or similar utensil, comprising two utensil units, each of said units having a substantially rectangular back, each back being provided with a bolt and a pair of parallel grooves, each of said grooves extending over the entire length of said back, the grooves in the back of one unit corresponding to those in the other unit, to permit alignment of the grooves of said two units, a handle for operating said two units jointly and separately, a union secured to said handle, said union being provided with openings, a lip adapted to engage both said backs, and two prongs disposed on opposite sides of said lip, one bolt of each unit being adapted to engage one opening of said union, nuts to fasten said bolts, said prongs being adapted to engage a groove of one of said units whereby the same may be secured to said handle; said prongs of the union being also adapted to engage simultaneously grooves of both units when aligned and said lip being adapted to simultaneously abut both said backs, whereby two units may be secured to the handle by means of said union and bolts to form a unitary double sized utensil, or said units may be separated and operated individually by means of said handle and union.

2. An article of the character described, comprising a wooden brush handle of uniform thickness, a union disposed at one end of said handle, said union consisting of metal and having substantially the form of a sleeve, said handle extending into said sleeve with the end of said handle adjacent to the lower opening of said sleeve, a stop on the inside of said sleeve near the lower opening thereof, said handle abutting said stop, whereby the end of said handle is prevented from projecting through the open lower end of said sleeve, said sleeve being provided with an extension plate below said stop at the front of said sleeve, the back of said sleeve being provided with a longitudinal slot disposed parallel with respect to the axis of said handle, a plurality of sharp points projecting from said sleeve into said handle to secure the sleeve to the latter, said projecting points forming an integral part of said sleeve, said extension plate of said sleeve being inclined with respect to the axis of said sleeve, said extension plate being provided with an opening and comprising a lip and a plurality of prongs disposed at right angles to said lip; a mop or similar utensil comprising a back, a pair of parallel grooves provided in said back, said grooves extending all along the length of said back, an aperture between said grooves and a bolt adapted to project through said aperture and opening in said back and in said extension plate respectively, to fasten said utensil to the same, said prongs being adapted to engage either one of said grooves.

3. As a new article of manufacture, a floor mop or similar utensil adapted for use with an operating handle which is provided with positioning and attaching means, comprising a substantially rectangular back, said back being provided with a pair of grooves, the latter serving to receive said positioning means, said grooves being disposed parallel to and coextensive with the longer edge of said rectangular back, and apertures provided in said back, at least one of said apertures being disposed adjacent one end of said back, said apertures serving to cooperate with said attaching means, whereby the operating handle may be secured to said back by simultaneous engagement with one of said apertures and one of said grooves, whereby said handle may be attached to said back in offset position near the apertured end thereof or at any other aperture along said grooves.

JACK FELDMAN.